(12) United States Patent
Zięcik et al.

(10) Patent No.: US 12,423,432 B2
(45) Date of Patent: Sep. 23, 2025

(54) BOOTLOADERS

(71) Applicant: Nordic Semiconductor ASA, Trondheim (NO)

(72) Inventors: Piotr Zięcik, Cracow (PL); Krzysztof Chruściński, Cracow (PL)

(73) Assignee: Nordic Semiconductor ASA, Trondheim (NO)

( * ) Notice: Subject to any disclaimer, the term of this patent is extended or adjusted under 35 U.S.C. 154(b) by 42 days.

(21) Appl. No.: 18/026,574

(22) PCT Filed: Sep. 16, 2021

(86) PCT No.: PCT/EP2021/075542
§ 371 (c)(1),
(2) Date: Mar. 15, 2023

(87) PCT Pub. No.: WO2022/058459
PCT Pub. Date: Mar. 24, 2022

(65) Prior Publication Data
US 2023/0342476 A1    Oct. 26, 2023

(30) Foreign Application Priority Data
Sep. 17, 2020   (GB) ..................................... 2014682

(51) Int. Cl.
*G06F 21/57*    (2013.01)
*G06F 8/654*    (2018.01)
(Continued)

(52) U.S. Cl.
CPC ............ *G06F 21/575* (2013.01); *G06F 8/654* (2018.02); *G06F 9/4401* (2013.01); *G06F 21/602* (2013.01); *G06F 2221/034* (2013.01)

(58) Field of Classification Search
CPC ...... G06F 21/575; G06F 8/654; G06F 9/4401; G06F 21/602
(Continued)

(56) References Cited

U.S. PATENT DOCUMENTS 5,918,047 A  *  6/1999  Leavitt ................ G06F 11/1417
                                                    714/E11.133
6,934,832 B1 *  8/2005  Van Dyke ............. G06F 9/3851
                                                    712/244
(Continued)

FOREIGN PATENT DOCUMENTS

CN         107967193 A    4/2018
WO    WO 2017/131712 A1    8/2017

OTHER PUBLICATIONS

Structured Computer Organization Third Edition by Andrew S. Tanenbaum p. 11-13 (Year: 1990).*
(Continued)

*Primary Examiner* — Paul R. Myers
(74) *Attorney, Agent, or Firm* — Klarquist Sparkman, LLP

(57) ABSTRACT

A bootloader comprises software instructions for execution by a processor of an electronic processing device. The bootloader comprises an interpreter for interpreting a boot script stored in a memory of the processing device, and an integrity checker for checking the integrity of boot scripts stored in the memory. The bootloader comprises instructions for using the integrity checker to check the integrity of a first boot script of a plurality of boot scripts stored in the memory. The bootloader also comprises instructions for using the integrity checker to check the integrity of a second boot script of the plurality of boot scripts stored in the memory, independently of the integrity of the first boot script. The interpreter comprises instructions for interpreting a control-flow command in the first boot script, the control-
(Continued)

flow command conditionally or unconditionally causing the bootloader to start interpreting commands from the second boot script.

20 Claims, 5 Drawing Sheets

(51) Int. Cl.
*G06F 9/4401* (2018.01)
*G06F 21/60* (2013.01)
(58) Field of Classification Search
USPC .......................................................... 713/2
See application file for complete search history.

(56) References Cited

U.S. PATENT DOCUMENTS

| | | | |
|---|---|---|---|
| 7,472,126 B2* | 12/2008 | Bangel | G06F 16/23 |
| 8,386,763 B1 | 2/2013 | Spangler et al. | |
| 10,275,259 B1* | 4/2019 | Jain | G06F 9/4411 |
| 2003/0014663 A1 | 1/2003 | Sormunen et al. | |
| 2005/0079868 A1* | 4/2005 | Shankar | G06F 21/575 |
| | | | 455/435.1 |
| 2005/0138409 A1* | 6/2005 | Sheriff | G06F 21/575 |
| | | | 726/26 |
| 2006/0184781 A1* | 8/2006 | Inada | G06F 8/60 |
| | | | 713/1 |
| 2006/0288161 A1* | 12/2006 | Cavallo | G06F 11/1076 |
| | | | 714/E11.034 |
| 2008/0288762 A1* | 11/2008 | Chen | G06F 21/575 |
| | | | 713/1 |
| 2009/0210870 A1* | 8/2009 | Clark | G06F 9/445 |
| | | | 709/202 |
| 2010/0257253 A1* | 10/2010 | Saha | G06F 21/52 |
| | | | 709/217 |
| 2011/0138164 A1* | 6/2011 | Cha | G06F 9/4406 |
| | | | 713/2 |
| 2011/0191597 A1* | 8/2011 | Grall | G06F 21/14 |
| | | | 718/100 |
| 2011/0283051 A1* | 11/2011 | Lieber | G06F 11/1417 |
| | | | 711/102 |
| 2012/0124357 A1* | 5/2012 | Zimmer | G06F 1/3206 |
| | | | 713/189 |
| 2013/0290946 A1* | 10/2013 | Iwadate | G06F 8/65 |
| | | | 717/168 |
| 2015/0067409 A1* | 3/2015 | Martz | G06F 21/52 |
| | | | 714/47.2 |
| 2015/0113258 A1* | 4/2015 | Grieco | G06F 21/572 |
| | | | 713/2 |
| 2015/0319160 A1* | 11/2015 | Ferguson | H04L 63/12 |
| | | | 726/10 |
| 2016/0378480 A1* | 12/2016 | Matveyev | G06F 9/30105 |
| | | | 712/208 |
| 2017/0221081 A1* | 8/2017 | Ollikainen | G06F 16/122 |
| 2019/0005245 A1* | 1/2019 | Laffey | G06F 3/0632 |
| 2019/0065751 A1* | 2/2019 | Srinivas | G06F 21/575 |
| 2019/0089545 A1* | 3/2019 | Dias Correa | H04L 63/126 |
| 2019/0278915 A1* | 9/2019 | Kim | G06F 21/572 |
| 2021/0097184 A1* | 4/2021 | Rao | G06F 21/51 |
| 2021/0103546 A1* | 4/2021 | Wessling | G06F 13/4068 |
| 2021/0200876 A1* | 7/2021 | Lin | G06F 9/4401 |
| 2021/0232381 A1* | 7/2021 | Winblad | G06F 9/4403 |
| 2022/0229748 A1* | 7/2022 | Ostrikov | G06F 11/0772 |

OTHER PUBLICATIONS

IPO Search Report under Section 17(5) for GB2014682.5, mailed Feb. 15, 2021, 3 pages.
International Search Report and Written Opinion for PCT/EP2021/075542, mailed Jan. 3, 2022, 16 pages.
Matzigkeit et al., "the GNU GRUB manual," The Grand Unified Bootloader, version 2.04, Jun. 24, 2019, 129 pages.

\* cited by examiner

BOOTLOADERS

CROSS REFERENCE TO RELATED APPLICATIONS

This is the U.S. National Stage of International Application No. PCT/EP2021/075542, filed Sep. 16, 2021, which was published in English under PCT Article 21(2), which in turn claims the benefit of Great Britain Application No. 2014682.5, filed Sep. 17, 2020.

BACKGROUND OF THE INVENTION

This invention relates to bootloaders for electronic processing devices.

Processing devices, such as embedded system-on-chip (SoC) devices, typically execute a bootloader early in a boot process after they are powered on or rebooted—e.g. after a static boot-ROM but before the main firmware. This bootloader checks and initialises the device hardware, such as the memory, before passing execution to another larger software module or firmware, such as an operating system or a user application. In some cases, bootloaders may be divided into multiple stages, with a relatively simple first-stage bootloader transferring execution to a more complex second-stage bootloader.

At times it can be necessary or desirable to modify the bootloader behaviour after a device has been deployed. For example, this may be necessary so that the bootloader can then assist in updating other software on the device, e.g. through an over-the-air firmware update process.

Scriptable bootloaders are known that allow bootloader operations to be controlled by a script or configuration file—for example, Das U-Boot from DENX Software Engineering™ and GNU GRUB 2. By loading a new script, the bootloader behaviour can be modified without having to replace the whole bootloader, which is an inherently risky operation as a device may be rendered unbootable (bricked) if the bootloader becomes corrupted.

However, known scriptable bootloaders do not provide sufficient flexibility in all situations.

The present invention therefore seeks to provide a more versatile bootloader.

SUMMARY OF THE INVENTION

From a first aspect, the invention provides a bootloader comprising software instructions for execution by a processor of an electronic processing device, wherein the bootloader comprises:
  an interpreter for interpreting a boot script stored in a memory of the processing device; and
  an integrity checker for checking the integrity of boot scripts stored in the memory of the processing device,
wherein:
  the bootloader comprises instructions for using the integrity checker to check the integrity of a first boot script of a plurality of boot scripts stored in the memory of the processing device;
  the bootloader comprises instructions for using the integrity checker to check the integrity of a second boot script of the plurality of boot scripts stored in the memory, independently of the integrity of the first boot script; and
  the interpreter comprises instructions for interpreting a control-flow command in the first boot script, wherein the control-flow command conditionally or unconditionally causes the bootloader to start interpreting commands from the second boot script.

From a second aspect, the invention provides an electronic processing device comprising:
  a processor; and
  a memory storing a bootloader comprising software instructions for execution by the processor, wherein the bootloader comprises:
    an interpreter for interpreting boot scripts stored in the memory of the processing device; and
    an integrity checker for checking the integrity of a boot script,
  wherein:
    the bootloader comprises instructions for using the integrity checker to check the integrity of a first boot script of a plurality of boot scripts stored in the memory of the processing device;
    the bootloader comprises instructions for using the integrity checker to check the integrity of a second boot script of the plurality of boot scripts stored in the memory, independently of the integrity of the first boot script; and
    the interpreter comprises instructions for interpreting a control-flow command in the first boot script, wherein the control-flow command conditionally or unconditionally causes the bootloader to start interpreting the second boot script.

Thus it will be seen that, in accordance with the invention, a bootloader is able to interpret two or more separate scripts, wherein the scripts are independently verifiable, but wherein control can flow from one script to another script during a boot sequence. This support for multiple scripts provides greater flexibility compared with a bootloader that can only interpret a single script when the device is booted up.

In particular, because the integrity of the scripts can be verified separately from one another, a single script can safely be replaced or updated in order to modify the behaviour of the bootloader without having to replace or re-verify the other script or scripts.

This can provide multiple benefits.

For instance, if there is an error in one script (e.g. due to a bug, or because of data corruption), it may be possible to recover from this situation by using a different script to boot the device into a state in which the erroneous script can be replaced.

By providing greater flexibility in scripting a bootloader, the need to update the underlying bootloader code itself may be further reduced, even compared with known scriptable bootloaders.

Because the scripts are independently verified by the device, multiple independent software developers may provide and maintain respective boot scripts on the same device. One developer may update its boot script without requiring close involvement from the other developers, as would likely be the case if the bootloader were not scriptable or if it could only parse a single script or configuration file.

The electronic processing device may be, or may comprise, an integrated-circuit device such as a system on chip (SoC). The processor and some or all of the memory may be integrated on a single semiconductor substrate. The memory of the processing device may comprise one or more volatile memory regions (e.g. RAM) and/or one or more non-volatile memory regions (e.g. flash) which may be integrated with the processor. It may additionally or alternative comprise a memory region that is on a separate chip from the processor—e.g. on a separate flash chip.

In some embodiments, the memory of the electronic processing device may further store such a first boot script comprising a control-flow command for causing the bootloader start interpreting commands from such a second boot script. The memory may further store the second boot script. However, this is not necessarily the case in all embodiments—e.g., the memory may, at times, store only the bootloader software without storing any boot scripts, such as before the device has been fully commissioned.

The bootloader may be a single executable image (e.g. object file). The device may be configured to execute the bootloader on the processor in response to a reset of the processor—e.g. whenever the device is rebooted. The bootloader may comprise a first instruction that is executed by the processor after a reset of the processor.

The memory may store one or more further executable images, such an application image or an operating-system image, or any other form or firmware image. The bootloader may comprise one or more instructions for transferring execution to an executable firmware image distinct from the bootloader. The bootloader may comprise initialisation instructions for initialising one or more components of the device, such as the memory or a controller for the memory. It may execute the initialisation instructions before starting interpreting any boot script.

Each boot script may comprise a respective sequence of one or more commands. The scripts may comprise bytecode commands. This can be more compact and space-efficient than human-readable configuration files. The interpreter may comprise a parser for fetching commands from a boot script. The interpreter may read and interpret commands sequentially. It may interpret one command at a time. It may use a table or switch statement to interpret each command and to execute a respective handler routine for each command.

The interpreter may comprise instructions for interpreting commands from a command set which may include any one or more of:
- a conditional control-flow command for branching interpretation to another boot script (e.g. a "SET ERROR HANDLER" command);
- a conditional control-flow command for transferring processor execution to an address in the memory (which could be an address of an on-chip memory region or of an off-chip, external memory region);
- an unconditional control-flow command for branching interpretation to another boot script (e.g. a "BRANCH" command);
- a command for copying data from a first region of the memory to a second region of the memory (e.g. a "COPY" command);
- a command for transferring processor execution to an address in the memory (e.g. an "EXEC" command);
- a command for decrypting data in a region of the memory (e.g. a "SET ENCRYPTION" command);
- a command for decompressing data in a region of the memory (e.g. a "SET COMPRESSION" command);
- a command for verifying the integrity (and optionally the authenticity) of data in a region of the memory (e.g. a "CRC32" or "SHA256" command);
- a command for protecting a region of the memory (e.g. by controlling a security peripheral to prevent or restrict read, write or execute access to the bootloader and/or to one or more boot scripts or applications);
- a command for preventing a boot script from being interpreted again; and
- a command for resetting (i.e. rebooting) the processor.

The command set may include a command (e.g. an "IMAGE" command) for associating a region of the memory with a firmware-image identifier (e.g. a unique binary value). Commands that act on an address or region of memory may then have a firmware-image identifier as a parameter, instead of address and/or size parameters. This may make developing a boot script more straightforward.

The above is not necessarily an exhaustive list of commands in the command set, although it may be in some embodiments.

The commands for decrypting and/or decompressing a region of the memory may instruct the bootloader to perform a decryption and/or data decompression operation when interpreting a subsequent command to copy data.

Each boot script may comprise, or be associated with, integrity data, accessible to the integrity checker. The integrity data may comprise a CRC, a hash, a MAC, an HMAC or a cryptographic signature. The integrity data may be stored in the memory of the device. The integrity checker may comprise instructions for checking one or more of: a cyclic-redundancy check (CRC) value; a hash; a cryptographic hash (e.g. a SHA hash); a message authentication code (MAC); a keyed Hash Message Authentication Code (HMAC); and a cryptographic signature (e.g. a DSA or RSA signature). It may comprise instructions for reading respective integrity data for the first and second boots script from the memory of the processing device. The bootloader may be arranged to prevent interpretation of some or all the commands in a boot script if the integrity of the boot script cannot be verified.

The bootloader may comprise instructions for using the integrity checker to check the integrity of each boot script each time the bootloader is executed. However, in other embodiments, it may check the integrity of each boot script before starting to interpret the boot script for a first time (e.g. when the boot script is written to the memory), but then interpret the boot script further times without rechecking the integrity of the boot script.

The control-flow command may be a conditional command. It may cause the bootloader to determine if a condition associated with the conditional command is met, and, if the condition is met, to start interpreting commands from the second boot script. The command may be an immediate conditional command, such as a "branch if equal" command, that causes the bootloader to determine just once whether the condition is met before interpreting any further commands, or it may be a delayed conditional command, such as a declaration of an error handler, that causes the bootloader to determine whether the condition is met after interpreting one or more further commands. The bootloader may determine just once if the condition associated with a delayed conditional command is met or it may test for the condition a plurality of times—e.g. after each successive command.

In some embodiments, the control-flow command in the first boot script is conditional and depends on an output of the interpretation of another command in the first boot script (e.g. a return value or an error signal).

The bootloader may comprise instructions for checking the integrity of other data stored in the memory (i.e. not just boot scripts), such as a firmware image. This may comprise verifying a CRC, hash, cryptographic hash, MAC, HMAC, or cryptographic signature for the data. It may comprise the bootloader detecting an error while attempting to decompress and/or decrypt the data. In particular, the control-flow command in the first boot script may cause the bootloader to start interpreting commands from the second boot script in response to the bootloader detecting an error in data stored in the memory of the device—e.g. in a firmware image stored in the memory. The error may be detected by the bootloader performing such an integrity check, which it may do while handling a script command to verify the data or a script command to decompress the data and/or decrypt the data and/or copy the data to a different location in memory.

The control-flow command may identify the second boot script by an identifier—e.g. a binary value—which may be a parameter for the command that is stored in the second boot script. The identifier may be independent of a memory address at which the second boot script is stored. The memory may store mapping data that maps one or more script identifiers to one or more addresses in the memory at which the respective script is stored. The bootloader may comprise instructions for accessing mapping data that maps one or more script identifiers to one or more addresses in the memory at which the respective script is stored. It may use the mapping data to determine a location of the second boot script. One or more script commands may support a script identifier as a parameter to the command. This can conveniently allow the developer of one script to invoke another script without having to know the memory location of the other script. In particular, the control-flow command in the first boot script may identify the second boot script by a script identifier that is independent of a memory address at which the second boot script is stored.

The script identifiers may form an ordered set—e.g. ordered by binary value. The bootloader may be arranged to identify a first identifier of a plurality of identifiers in the mapping data (e.g. a lowest value identifier) and to start interpret the respective script first after a reset. This provides a convenient mechanism for a developer to control the order of script interpretation. It may, for example, allow a particular value (e.g. an identifier of zero) to be reserved for identifying a temporary update script that should only be interpreted once before being deleted, without having to disturb the order of the remaining scripts.

The first or second boot script may comprise a command that identifies an address in the memory and that, when interpreted by the interpreter, conditionally or unconditionally causes the bootloader to transfer processor execution to that address. This may be used to transfer execution to an operating system or application under normal reboot conditions and/or to handle an error condition. In some embodiments, the command is unconditional.

The first boot script may comprise a command that, when interpreted by the interpreter, causes the bootloader to transfer execution to a first firmware image stored in the memory of the device. The second boot script may comprise a command that, when interpreted by the interpreter, causes the bootloader to transfer execution to a second firmware image stored in the memory of the device. The first firmware image may be a default image, and the second firmware image may be a fallback image which is executed in response to an error, such as an integrity verification of the first firmware image by the bootloader failing (e.g. a CRC or signature verification error).

The memory may store one or more further boot scripts. It may, at times, store an update boot script, comprising one or more commands that cause the bootloader to copy data to the memory of the device. The data may be a binary firmware image. It may be copied from another location in the memory—e.g. from a first region of flash to a second region of flash, or from RAM to a separate non-volatile memory chip. The data may be received over a wired or wireless interface of the electronic processing device, such as a radio modem. The update boot script may comprise one or more commands that cause the bootloader to decompress the data that is copied. The update boot script may comprise one or more commands that cause the bootloader to decrypt the data that is copied. The update boot script may comprise one or more commands that cause the bootloader to verify the integrity (and optionally authenticity) of the data that is copied. The interpreter may comprise instructions for interpreting such copy and/or decompress and/or decrypt and/or integrity-check commands, which may be different commands or overlapping or the same commands.

The update script may be received in an update package which may also comprise the data. The update package may comprise one or more binary firmware images—e.g. a new default firmware image and a new fallback firmware image. It may comprise one or more further scripts, e.g. for interpretation after further device resets, during normal operation, after the update script has been interpreted once to update the memory of the device. Each further script may include a command for causing the processor to start executing a different respective one of the binary firmware images.

The bootloader may comprise instructions for preventing a particular script (e.g. an update script) from being interpreted again after it has been interpreted once. It may do this in response to a particular command in the boot script, or for scripts having a particular script identifier (e.g. a reserved update-script identifier value, such as an identifier of zero), or if a script reaches the end without transferring interpretation to another script and without branching execution to a binary firmware image. It may be configured to do this by removing a script identifier of a current script from the mapping data.

If the interpreter reaches the end of a script (which may be signified by a particular data value in the memory, or in any other suitable way), the bootloader may be configured to cause the processor to reset. When combined with the removal of an update script from the mapping data, this provides a convenient mechanism for enabling the device to start interpreting a new default script after an update process completes.

In some embodiments, the device is configured to store a first set of scripts in a first non-volatile memory page, and to store a second set of scripts in a second non-volatile memory page. The bootloader instructions may be stored in a third non-volatile memory page. Each page may be independently erasable. Such an arrangement may enable one of the sets of scripts to be erased safely, since the other set of scripts will be available in case of an unexpected power loss or reset during the erase. The second set may include a copy of at least one, and possibly all, the scripts in the first set. In other embodiments, the first set of scripts may comprise one or more update scripts (i.e. scripts that include commands for copying data between memory locations) and the second set of scripts may comprise one or more non-update scripts (i.e. not including commands for copying data between memory locations).

The bootloader may comprise instructions for writing log entries to a journal in the memory of the device. It may log each new command that the interpreter interprets in a script. It may do this for all scripts, or only for update scripts. The bootloader may comprise instructions for reading the journal after a reset to identify an unexpected reset during interpretation of a script (e.g. in case of a power failure). It may be configured to use the journal to recover from the unexpected reset—e.g. by resuming interpretation of the script at the command that was being handled when the reset occurred.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
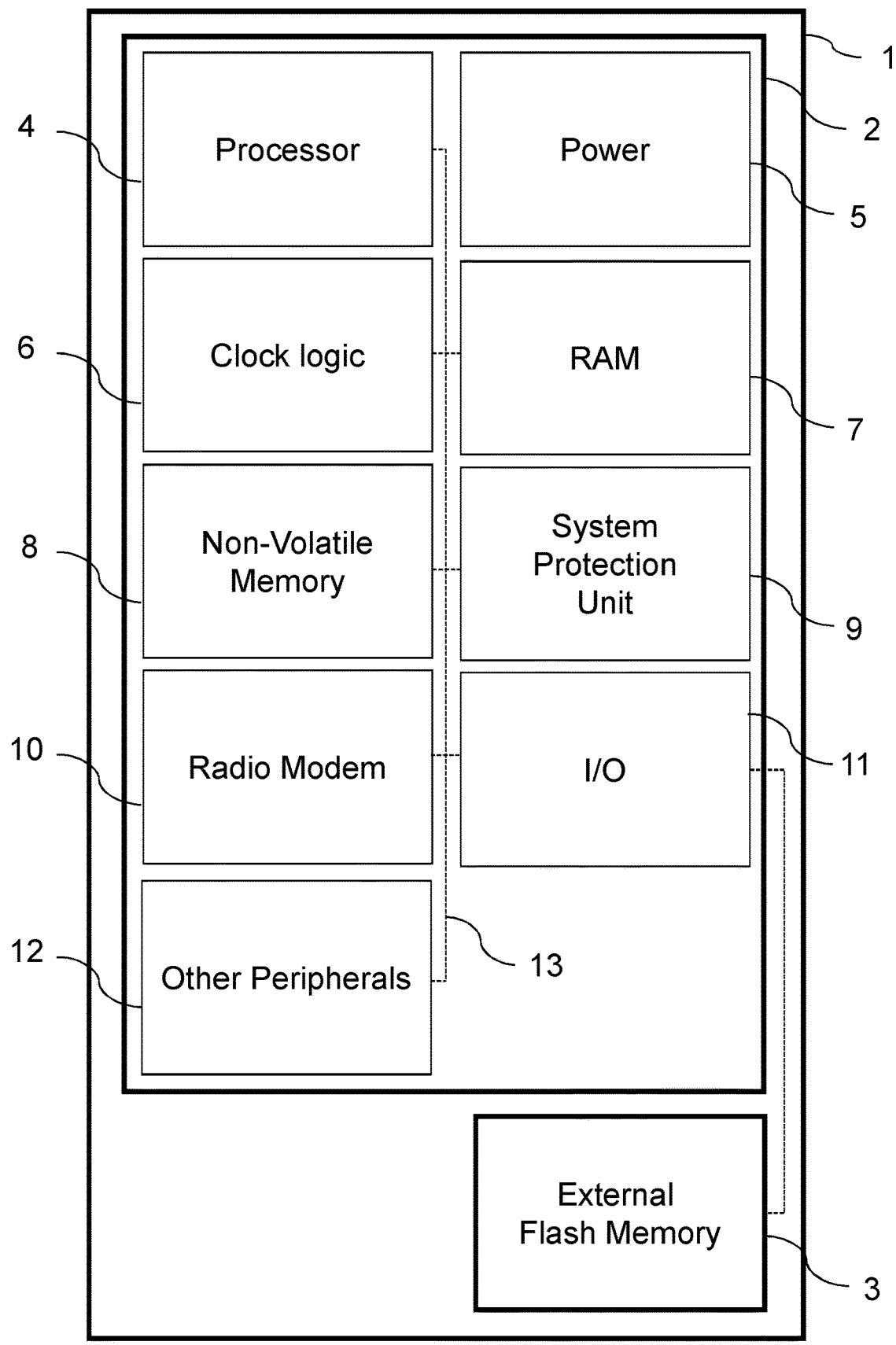
FIG. 1 is a schematic drawing of a microcontroller embodying the invention.

FIG. 1 schematically shows a device 1, such as a wireless sensor unit, that contains an integrated-circuit microcontroller 2 with on-board digital radio capabilities (i.e. a radio-on-a-chip device). A separate flash memory chip 3 is connected to the microcontroller 2. The device 1 could be a wireless building temperature sensor, a wearable sensor, or other Internet-of-Things device.

The microcontroller 2 includes:
a main processor 4 (e.g. an Arm™ Cortex™-M33);
power management circuitry 5;
clock logic 6 (which may receive a periodic signal from an off-chip crystal oscillator);
random-access memory (RAM) 7;
non-volatile memory (NVM) 8 such as NOR-type flash memory;
a system protection unit 9;
a radio modem 10 (e.g. a radio transceiver supporting 3GPP 4G Cat-M1 and/or Cat-NB1 standards);
input/output circuitry 11 (e.g. SPI, GPSI, I2C, UART, GPIO pins, etc.);
further peripherals 12, such as timers, cryptographic accelerators, analogue-to-digital converters, etc.; and
a bus system 13, e.g. implementing the Arm™ Advanced Microcontroller Bus Architecture (AMBA) standard.

It should be appreciated that a microcontroller is just one possible embodiment, and principles disclosed herein may also be applied to other, e.g. larger, computer systems.

The device 1 may contain any number of other components, such as a power supply, radio antenna, crystal oscillator, capacitors, sensors, audio/visual output devices, etc., not shown here for simplicity, some of which may be connected to the microcontroller 2.

The radio modem 10 may include its own processor, separate from the main processor 4, and may have separate volatile and/or non-volatile memory for executing firmware for controlling the radio modem 10.

The system protection unit 9 is arranged to intercept bus transactions and to control access between the processor 4, the memory devices 7, 8, 3, and the peripherals 10, 12—e.g. based on whether the respective devices and/or memory regions are in a secure or non-secure state. It may support Arm™ TrustZone™ access principles.

Figure 2:
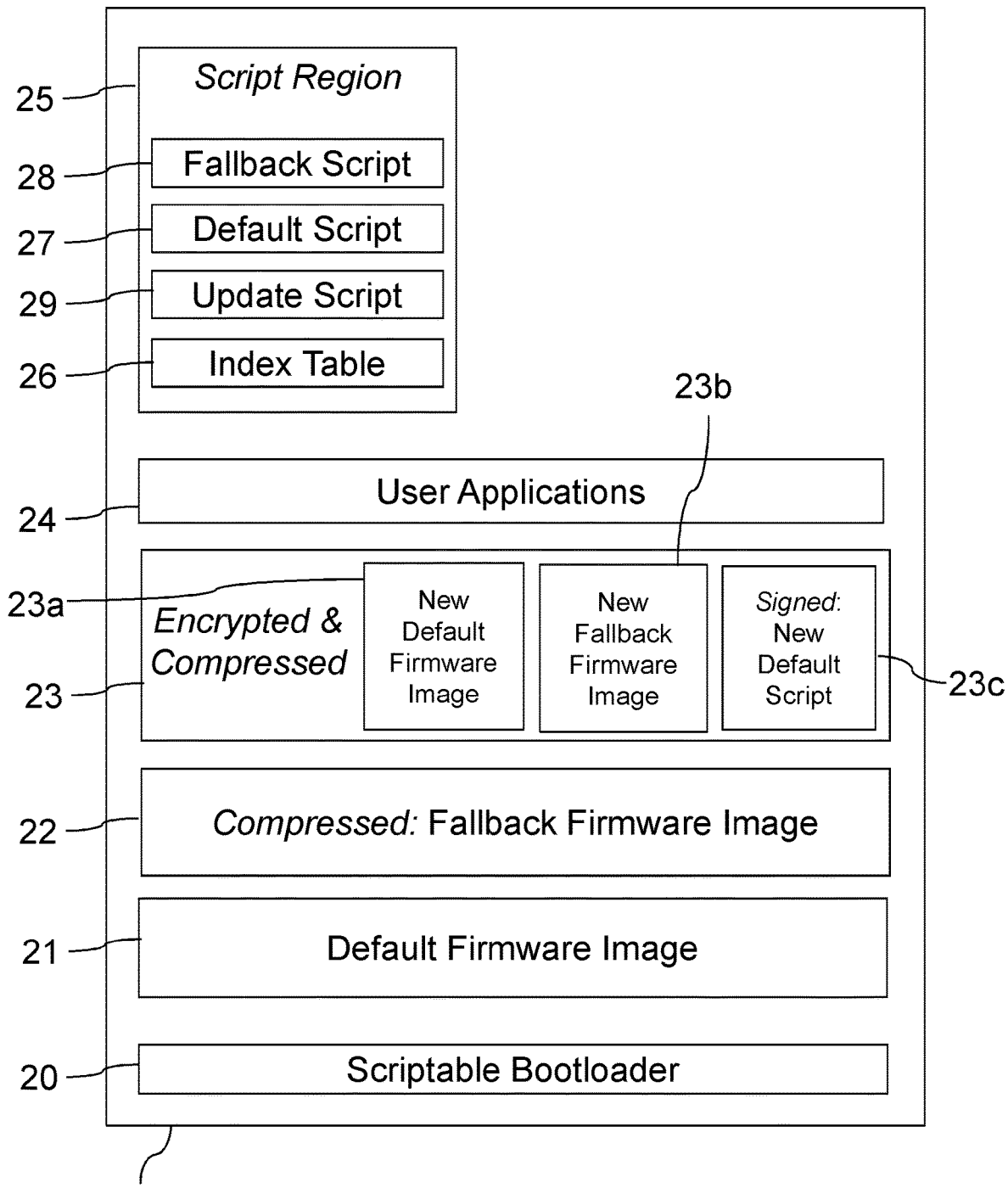
FIG. 2 is a schematic drawing of the software architecture stored in a memory of the microcontroller.

FIG. 2 shows the major components of an exemplary software architecture for execution by the main processor 4, which is stored in the non-volatile memory 8 and/or external flash memory 3. Not of all the elements shown in FIG. 2 will necessarily be present in the memory 8, 3 at any instant. The software may be executed directly from the non-volatile memory 8, 3, or instructions may be copied to the RAM 7 first, before being executed from the RAM 7.

The software architecture includes:
a scriptable bootloader 20, embodying the invention;
one or more firmware images, which in this example include a default firmware image 21, a compressed fallback firmware image 22, and an encrypted firmware update package 23; and
zero or more user applications 24.

The memory 8, 3 also contains a script region 25 for storing scripts for interpretation by the bootloader 20. Each stored script is indexed in a table 26 (i.e. mapping data), which maps a script identifier (e.g. ID=0) to a memory address within the script region at which a respective script is stored. In other embodiments, the scripts might be indexed using a different mechanism instead of a table. The index may be created dynamically in some embodiments.

In this example, the script region 25 contains a default script 27, a fallback script 28 and an update script 29. The default script 27 is associated with the default firmware image 21. The fallback script 28 is associated with the fallback firmware image 22. The update script 29 is associated with the firmware update package 23.

Unlike the other firmware images 21, 22, the update package 23 is not executable directly, but instead includes a new default firmware image 23a, new fallback firmware image 23b, and a new default script 23c, in encrypted and compressed form.

In other embodiments, the update script 29 may be stored with, or as part of, the update package 23, rather than being stored separately in the script region 25—e.g. it may be located at the beginning of the package 23, before the compressed and encrypted firmware images.

Each script 27, 28, 29 comprises a sequence of bytecode commands, for interpretation by the bootloader 20. Each bytecode command can include an operation code and zero or more parameters.

Figure 3:
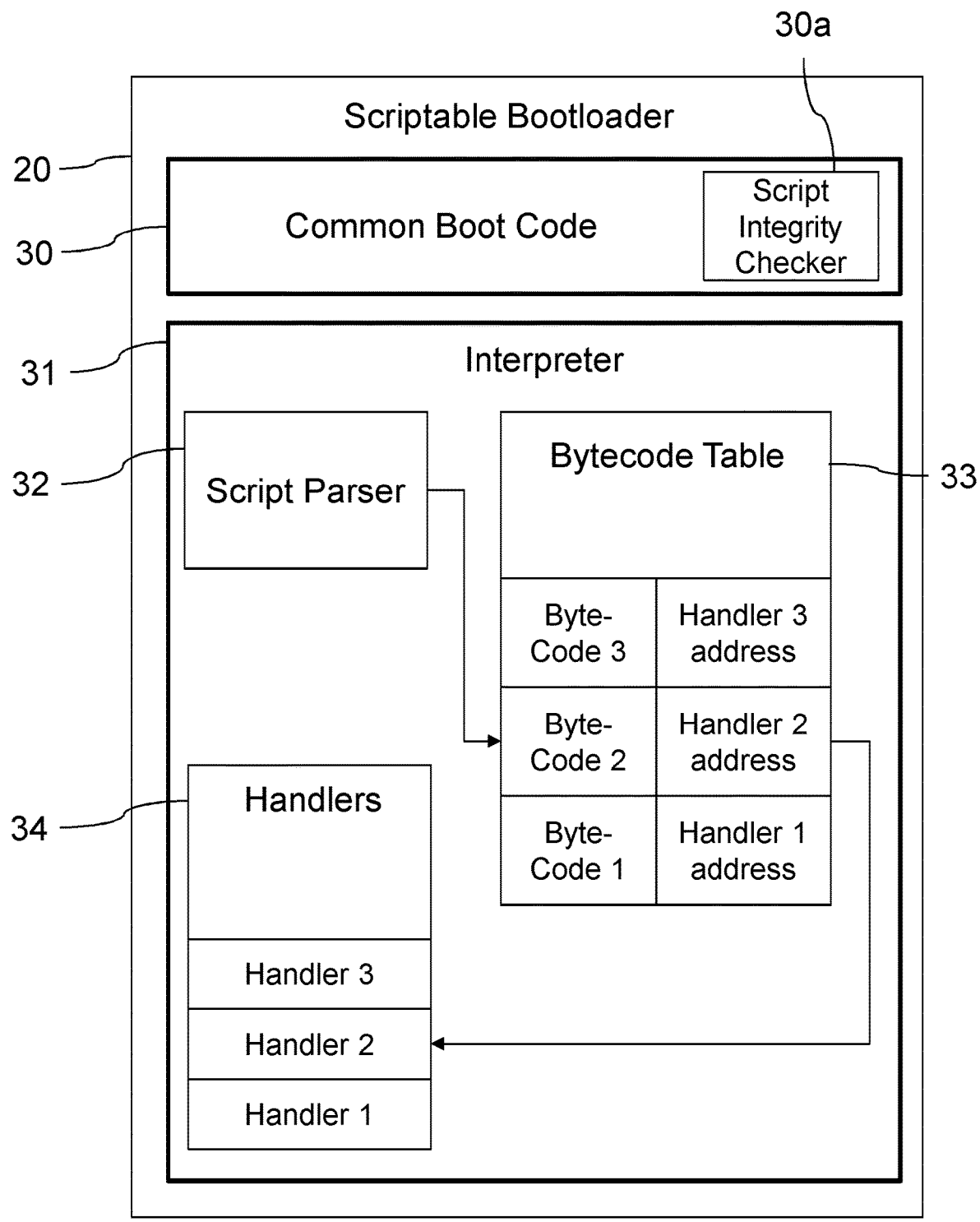
FIG. 3 is a schematic drawing of a scriptable bootloader, embodying the invention, of the software architecture.

FIG. 3 shows the architecture of the scriptable bootloader 20 in more detail. It contains some common boot code 30 and an interpreter 31.

The common boot code 30 is executed the same, regardless of any boot scripts. It is at the entry point for execution after a reset or reboot—i.e. it contains the first processor instructions that are executed when the processor 4 starts up. It can perform any essential hardware checks and initialisation that should be undertaken before any boot script is interpreted and before control is transferred to a firmware image—e.g. loading a cryptographic key for establishing a root of trust for the boot process.

Once these initial tasks have been completed, the common boot code 30 parses the index table 26, which is located at a fixed address in the memory 8, 3, to identify what script to interpret first. The index table 26 stores an array of one or more pairs of identifier value (ID) and corresponding script address. Each script is given a unique integer ID when it is stored in the script region 25. The boot code 30 parses the table 26 to identify the script having the lowest ID and passes the corresponding address to the interpreter 31. In other embodiments, an alternative mechanism may be used for identifying a first script to interpret, such as storing a flag next to one script, or identifying a maximum ID, or providing priority values separate from the identifier values.

The interpreter 31 comprises a script parser 32 for retrieving a succession of commands from scripts stored in the script region 25. It maintains a script counter which points to the next command to retrieve. It retrieves commands from sequential memory addresses unless a command involves a branch to a different address. In some embodiments, the script parser 32 accesses a table 33 that maps bytecode operation codes to corresponding handler addresses. Each handler address points to a respective handler routine from a set of handler 34 within the bootloader 20. When interpreting a bytecode command, the script parser 32 searches the table 33 to identify the address of the corresponding handler, before putting any bytecode parameters on a stack in RAM 7 and invoking the handler. Other embodiments may implement this differently, e.g. using a list or other data structure.

Each of the handlers 34 performs a different operation, such as copying data from one region of memory to another, or verifying a hash of a region of memory. Script interpretation ends when an "execute" bytecode command ("EXEC") causes the processor 4 to branch to an address in the RAM 7 or non-volatile memory 8, 3; this address may be an entry point to a firmware image 21, 22.

Notably, the script parser 32 is able to transfer the interpretation flow from one script 27, 28, 29 to another script 27, 28, 29 in response to detecting an error condition—i.e. an exception. When a first script contains an "error handler" bytecode command ("SET ERROR HANDLER") with a parameter (a script ID) that identifies a second script, the corresponding handler 34 stores the script ID in memory (e.g. in a register); if another handler 34 subsequently signals an error to the script parser 32, the parser 32 updates the script counter with the corresponding script address from the index table 26, so that interpretation branches to the beginning of the second script. Thus, a conditional branch to a different script occurs in response to an error signal, which may arise when interpreting one of a number of other bytecode commands, such as a "cyclic redundancy check" bytecode command ("CRC32") whose handler is arranged to signal an error if the CRC of a region of memory fails (i.e. if the data in the region is not valid). Note that, although the condition is referred to here as an "error" condition, for ease of reference, the condition need not necessarily represent an error in a traditional sense (e.g. a fault or failure) but could simply be a form of binary return value communicating an output from one of the handlers 34.

However, in some embodiments, a branch may occur as an immediate result of the interpreter 31 interpreting an "unconditional branch" bytecode command or a "conditional branch" bytecode command.

The set of bytecode commands recognised by the interpreter 31 may include an unconditional branch (i.e. a jump or goto) that takes a target script ID as a parameter.

The set of bytecode commands may additionally or alternatively include one or more conditional branch commands having parameters that define a test condition and a target script ID to branch to when the test condition is true. The test condition may depend on one or more variables stored in memory—e.g. in variable registers or in a stack in RAM 7, managed by the interpreter 31. The test could be whether a first variable is equal to a second variable, for instance. Such direct conditional branch commands may, however, introduce more complexity to the bootloader 20 than is desirable in some situations, and so some embodiments may instead only use error signals to provide a simpler way of supporting conditional branching.

More generally, the set of recognised bytecode commands may include any of the following:

| Bytecode mnemonic | Parameters | Description | Error signalling? |
| --- | --- | --- | --- |
| IMAGE | Image ID, Memory Device, Start Address, Size | Declares a region of memory for storing a firmware image or the script region | |
| COPY | Destination Image ID, Source Image ID | Copies data from the source image to the destination image location | Yes, if copy operation fails. |
| SET ERROR HANDLER | Script ID | Sets a script to start interpreting in case of an error | |
| CRC32 | Image ID, CRC Value | Performs a cyclic redundancy check on an image | Yes, if CRC doesn't match or if the image cannot be read |
| SHA256 | Image ID, Hash Value | Checks the cryptographic hash of an image | Yes, if hash doesn't match or if the image cannot be read |
| SET COMPRESSION | Image ID, Method Type | Configures the bootloader to decompress (or optionally compress) the source image in a subsequent data read/write operation such as a COPY, CRC32 or SHA256 | |

-continued

| Bytecode mnemonic | Parameters | Description | Error signalling? |
|---|---|---|---|
| | | operation, using the identified algorithm | |
| SET ENCRYPTION | Image ID, Method Type, Key Value | Configures the bootloader to decrypt (or optionally encrypt) the source image in a subsequent data read/write operation such as a COPY, CRC32 or SHA256 operation, using the key and the identified algorithm | |
| EXEC | Address | Transfer processor execution to the indicated address | |
| BRANCH | Script ID | Start interpreting the indicated script | |
| COMPARE | Image ID1, Image ID2 | Checks if two images are identical (e.g. in order to validate a copy or to detect if an image is already copied when recovering from an interrupted script) | Yes, if the images differ |
| IMAGE RESET | Image ID | Resets the read/write pointer to the start of the image, in embodiments in which a pointer is used to allow multiple COPY operations to read from & write to successive regions within a single image, instead of always reading/writing from the beginning of the image. | |

Other commands may, of course, be supported in some embodiments, e.g. security-related commands such as checking a software version number to prevent downgrades.

During a commissioning process, the scriptable bootloader 20, default firmware image 21, fallback firmware image 22, default script 27 and fallback script 28 may be written directly to the NVM 8, e.g. through a debug port. The default script 27 is given a lower ID value in the index table 26 (e.g. ID=10) than the fallback script 28 (e.g. ID=20).

Each script in the script region 25 (including scripts loaded in the field) is accompanied by a CRC value, hash, message authentication code (MAC) and/or cryptographic signature, which the bootloader 20 is configured to use to verify the integrity (and optionally the authenticity) of the script. Cryptographic script verification may be performed using a secret key or a public key that is pre-stored on the device 2—e.g. hardcoded in the bootloader 20 software or stored separately in a read-only region of the non-volatile memory 8—or in any other appropriate way.

The common boot code 30 in the bootloader 20 may contain a script integrity checker routing 30a to verify the integrity of all the scripts referenced in the index table 26 every time the device 2 is reset, or on a script-by-script basis before starting to interpret a script. Script integrity may additionally or alternatively be checked when a new script is written to the script region 25 by the bootloader 20; this may be more efficient than verifying a script every time it is interpreted, although it could potentially be less secure. However, in some embodiments, the hardware system protection unit 9 may be configured to restrict writing to the script region 25 (e.g. to the bootloader 20 and trusted firmware images only), thereby providing further security.

If a script can't be appropriately verified (i.e. is untrusted), the bootloader 20 may prevent it from being interpreted at all, or it may restrict what bytecode commands from the untrusted script are interpreted and handled; for example, it may be configured to ignore COPY commands from untrusted scripts.

In normal usage, whenever the microcontroller 2 is reset, the bootloader 20 will identify the default script 27 as having the lowest script ID and will start interpreting its commands. The default script 27 may be as simple as:

EXEC <address: 0xAAAAA> where 0xAAAAA is the entry address to the default firmware image 21. This causes the bootloader 20 to transfer execution to the default firmware image 21.

In some embodiments the "EXEC" command may assume that executable scripts are always stored in internal memory 8, so not need a memory device identifier, whereas non-executable images may be stored on the external memory 3, so the "IMAGE" command requires a memory_device parameter.

A slightly more complex example would be:

- IMAGE <image_id: 1> <memory_device: 1> <start_address: 0xAAAAA> <size: 0xNNNNN>
- SET ERROR HANDLER <script_id: 20>
- CRC32 <image_id: 1> <crc: 0x01010101>
- EXEC <address: 0xAAAAA>

This causes the bootloader 20 to assign an Image ID of "1" to the default firmware image 21, located at address 0xAAAAA in the internal NVM 8 (referred to as memory device "1"). It sets the fallback script 28 to handle any subsequent error from the CRC check. It then commands the bootloader 20 to perform a 32-bit CRC check on the default firmware image 21, where the correct CRC value is hard-coded into the default script 27. Assuming the check passes (i.e. no error is signalled), execution transfer to the default firmware image 21.

If the CRC check fails, the bootloader 20 starts interpreting the fallback script 28. This may contain the following:

- IMAGE <image_id: 2> <memory_device: 1> <start_address: 0xBBBBB> <size: 0xNNNNN>
- IMAGE <image_id: 3> <memory_device: 0> <start_address: 0xCCCCC> <size: 0xNNNNN>
- SET COMPRESSION <source_image_id: 2> <method: LZO>
- COPY <destination_image_id: 3> <source_image_id: 2>
- EXEC <address: 0xCCCCC>

This declares the location of the compressed fallback image file 28 located at address 0xBBBBB in the NVM 8 and assigns it an Image ID of "2". It also assigns Image ID of "3" to a larger region in RAM 7, starting at address 0xCCCCC, for receiving a copy of the decompressed fallback image 28. It informs the bootloader 20 that the fallback image file 28 is currently compressed using, for example, LZO compression. It then commands the bootloader 20 to decompress and copy the fallback image 28 from the NVM 8 to the RAM 7 region. It then instructs the bootloader 20 to transfer execution to the decompressed fallback image 28 located in RAM 7. The fallback image 28 may perform whatever actions are appropriate to deal with the corruption of the default firmware image 21, such as alerting a user on an I/O device 11, or signalling a remote server to receive a replacement default firmware image over the radio modem 10.

It will be appreciated these are just example scripts and many variations are possible. For instance, a SHA hash check could be performed instead of a CRC, potentially giving greater security. A fallback image could be stored in the NVM 8 without compression and executed directly. The fallback script could check the CRC of the fallback image 28 before executing it.

If the firmware requires updating after the device 1 deployed, e.g. to provide additional functionality or to rectify a bug or other fault, this may be accomplished by an over-the-air update using the radio modem 10, or through a wired I/O connection 11. The firmware update package 23 and a corresponding update script 29 may be received by radio or through a wired connection, and written to the RAM 7, NVM 8 or external flash 3, by a user application 24 or by the default firmware 21. The update script 29 is entered in the index table 26 with the ID="0", which is a value reserved for transient update scripts.

In some alternative embodiments, the update script 29 is not indexed in the table 26, but is stored together with the update package 23 in a region of the memory 3, 8 reserved for updates. The bootloader may check for the presence of an update script 29 in the reserved region, and interpret it if such a script is found. It may perform this check natively or under the control of a default script. In the latter case, a default script may include the following commands:

- SET_ERROR_HANDLER <boot_firmware_script>
- IS_VALID_SCRIPT <start address: 0xF000000> //update region where "boot_firmware_script" identifies a script to be interpreted when no update is present, and where "IS VALID SCRIPT" is a command for checking a memory address for the presence of a parsable script.

To initiate the update, the application 24 or default firmware 21 then resets the device 1.

An example update script 29 is:

- IMAGE <image_id: 5> <memory_device: 2> <start_address: 0xDDDDD> <size: 0xNNNNN>
- IMAGE <image_id: 1> <memory_device: 1> <start_address: 0xEEEEE> <size: 0xMMMMM>
- IMAGE <image_id 4> <memory_device: 2> <start_address: 0xFFFFF> <size: 0xPPPPP>
- IMAGE <image_id: 99> <memory_device: 1> <start_address: 0xGGGGG> <size: 0xQQQQQ>
- SET ERROR HANDLER <script_id: 2>
- SHA256 <source_image_id: 5> <hash: 0x01010101>
- SET ENCRYPTION <source_image_id: 5> <method: AES> <key: 0x01010101>
- SET COMPRESSION <source_image_id: 5> <method: LZO>
- SET ERROR HANDLER < script_id: 3>
- COPY <destination_image_id: 1> <source_image_id: 5>
- COPY <destination_image_id: 4> <source_image_id: 5>
- COPY <destination_image_id: 99> <source_image_id: 5>

Before interpreting the update script 29, the bootloader 20 first verifies a CRC or hash or signature of the update script 29, to detect any data corruption during transmission or when writing to memory (e.g. in case of unexpected power loss) and/or to reduce the risk of a malicious attack.

In the example, the compressed and encrypted firmware update package 23 has been stored, temporarily, at address 0xDDDDD in external flash memory 3 (memory device "2"). It contains:

a new default firmware image 23a for the NVM 8;
a new fallback firmware image 23b to be stored on the external flash 3 (e.g. because there may be insufficient space in the internal memory 8); and
a new default script 23c, and optionally one or more replacement fallback scripts.

The update script 29 may be stored separately from the update package 23, e.g. in a script region, or may be stored together with the compressed and encrypted update package 23.

It first declares four image IDs:
ID=5 for the compressed and encrypted update package image 23;
ID=1 for a region, from address 0xEEEEE in the NVM 8, to contain the decrypted and decompressed new secondary firmware image;
ID=4 for a region, from address 0xFFFFF in the external flash memory 3, to contain the decrypted and decompressed new fallback firmware image; and
ID=99 for the script region 25, starting at address 0xGGGGG in the NVM 8, which will be overwritten with the new script region data.

The update script 29 then sets a first fallback script to branch to in case the SHA hash verification fails. This fallback script could invoke a function in the default firmware image 21, or in a user application 24, or perform any other appropriate actions. The script 29 then commands the bootloader 20 to check the SHA hash of the compressed and encrypted new default firmware package 23. It then configures the decryption method and key (in this example, using AES), and decompression method (in this example, LZO), and changes the error handler script to a second fallback script, which could be the same as the first fallback script or different. The script 29 then commands the bootloader 20 to perform three COPY operations, which decrypt and decompress the update package 5, and then copy the first 0xMMMM bytes to address 0xEEEEE in the NVM 8, the next 0xPPPPP bytes to address 0xFFFFF in the external flash 3, and the next 0xQQQQQ bytes to address 0xGGGGG in the NVM 8. If any of the copy operations fails for any reason, e.g. because decompression or decryption operation signals an error, the bootloader will transfer execution to an error-handling script having a Script ID of three.

If the interpreter 31 reaches the end of a script, such as the update script 29, without a final EXEC, the bootloader 20 automatically clears the current script ID from the index table 26 (effectively deleting the update script 29 so that it doesn't run again) and resets the processor 4 or the whole microcontroller 2.

The bootloader 20 may maintain a journal, in which it logs the execution state of the current script. It can then use this journal to restore the state and resume script interpretation upon rebooting if the device 1 encounters an unexpected interruption, such as a power failure.

In some embodiments, scripts are stored in two separate flash pages: one page holding all the scripts needed for normal execution, which could be replaced in its entirety during an update process; and another page holding any update script and the journal. This second page may be erased after a successful update.

Figure 4:
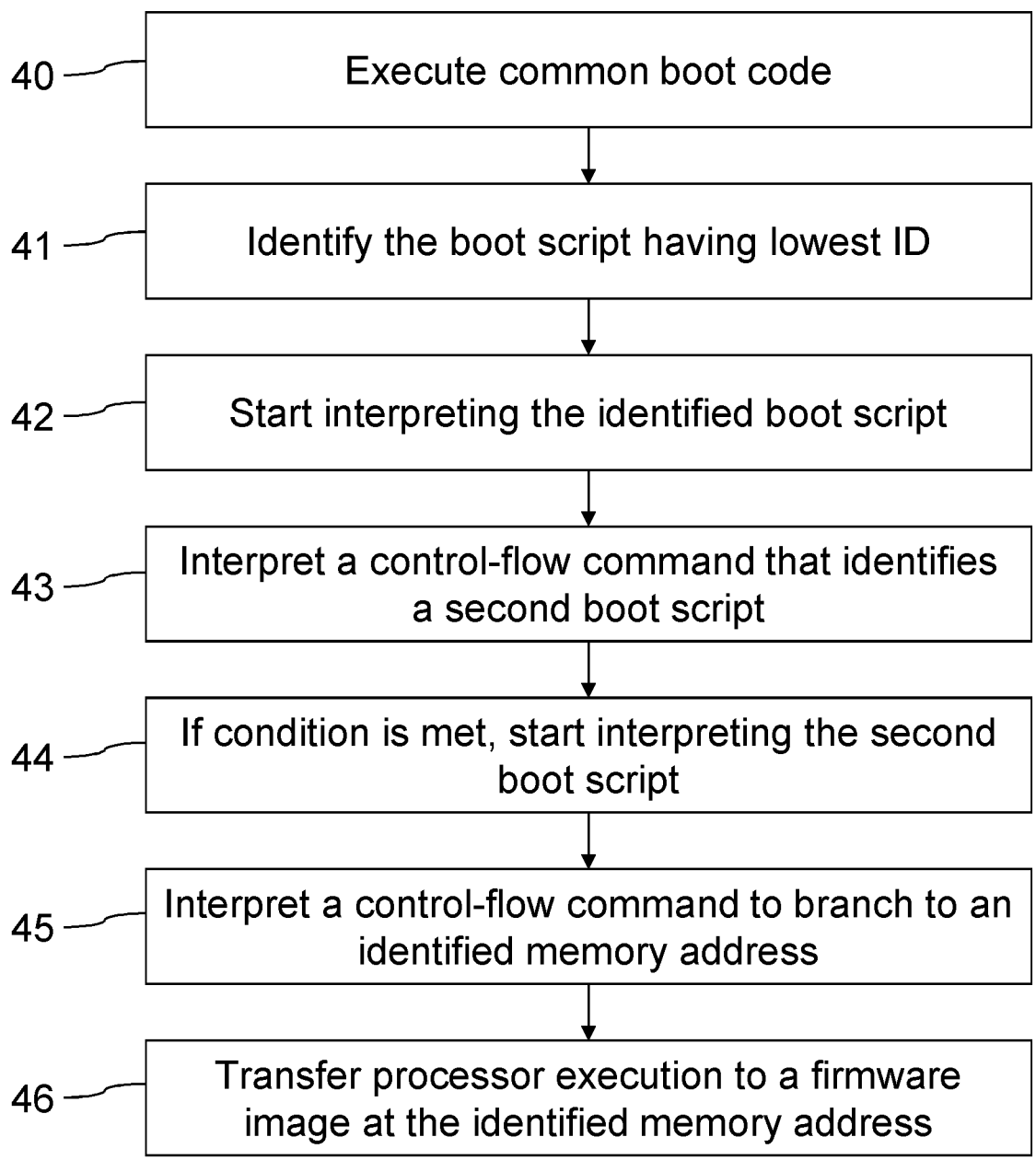
FIG. 4 is a flow chart of exemplary operations performed by the microcontroller, executing the scriptable bootloader, as control transfers from a first boot script to a second boot script.

FIG. 4 summarises the operations performed by the processor 4 when a first boot script invokes a second boot script. First, the bootloader 20 executes 40 the common boot code to initialise the microcontroller 2. The bootloader 20 then parses the index table 26 to identify 41 what script to interpret first, based on the script having the lowest Script ID. It may check a CRC or signature of the script. It then starts interpreting 42 the commands from the first boot script. A control-flow bytecode command identifies the second boot script: this could be a conditional or unconditional branch command, or a command that instructs the bootloader 20 to switch to the second boot script if a condition is met during interpretation of a later command (e.g. if an error signal issues). The bootloader 20 optionally checks 44 when the condition is met, and the interpreter 31 starts interpreting the second boot script when the condition is met (or immediately if the condition is null). The second script may then include a control-flow command, such as an EXEC command described above, which, when interpreted 45 by the bootloader 20, causes the processor 4 to stop executing the bootloader code 20 and start executing 46 software instructions located at an indicated memory address. The command parameter may identify the memory address explicitly, or it may identify a firmware image by a previously-defined image identifier.

Figure 5:
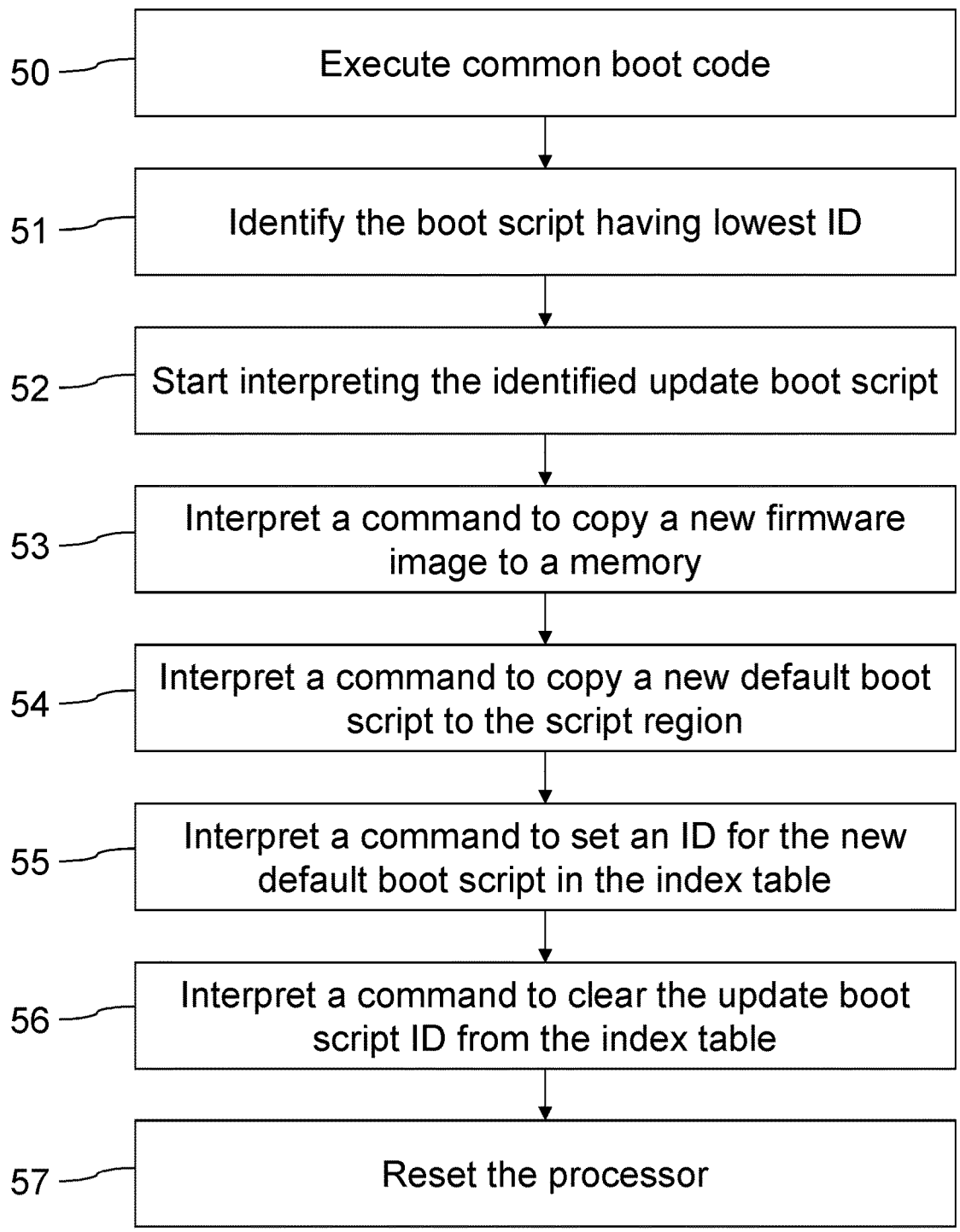
FIG. 5 is a flow chart of exemplary operations performed by the microcontroller, executing the scriptable bootloader, as an update boot script loads a new firmware image and a new default boot script.

FIG. 5 summarises the operations performed by the processor 4 when an update boot script loads a new firmware image and a new default boot script, after a device reset. First, the bootloader 20 executes 50 the common boot code to initialise the microcontroller 2. The bootloader 20 then parses the index table 26 to identify 51 what script to interpret first, based on the script having the lowest Script ID. In this example, an update script has been stored by an application, and allocated the Script ID=0, to ensure it is interpreted first. However, in other embodiments, an application may not be authorised to write to the script region 25 for security reasons and so, in some embodiments, the bootloader 20 may check a dedicated area of memory (e.g. an area reserved for holding an update package 23) for the presence of an update script or update package 23, and may interpret any such update script instead of a default script 27 if it is present. The bootloader 20 may check a CRC or signature of the update script, which may cover just the update script or the update script and the rest of the update package 23 together.

The bootloader 20 then starts interpreting 52 the commands from the update script. It interprets 53 a command to copy a new firmware image, stored temporarily in memory, to its new permanent location in memory. It may perform decompression and/or decryption during the copy operation. It also interprets 54 and handles a command to copy one or more new boot scripts to the script region. It sets 55 appropriate new script IDs in the index table 26 and clears 56 the update boot script ID of "0" from the index table 26, or removes the update script from a reserved area of memory. The bootloader 20 then resets the processor 4, causing the new default script of lowest script ID to be interpreted after the reboot.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A non-transitory computer-readable medium storing a bootloader comprising software instructions for execution by a processor of an electronic processing device, wherein the bootloader comprises:
an interpreter for interpreting a boot script stored in a memory of the electronic processing device; and
an integrity checker for checking the integrity of boot scripts stored in the memory of the electronic processing device, wherein:
the bootloader comprises instructions for using the integrity checker to check the integrity of a first boot script of a plurality of boot scripts stored in the memory of the electronic processing device;
the bootloader comprises instructions for using the integrity checker to check the integrity of a second boot script of the plurality of boot scripts stored in the memory, independently of the integrity of the first boot script; and
the interpreter comprises instructions for interpreting a control-flow command in the first boot script, wherein the control-flow command conditionally or unconditionally branches interpretation to an address of the second boot script, thereby causing the bootloader to start interpreting commands from the second boot script.

2. The non-transitory computer-readable medium storing a bootloader of claim 1, wherein the bootloader comprises one or more instructions for transferring execution to an executable image separate from the bootloader.

3. The non-transitory computer-readable medium storing a bootloader of claim 1, wherein the interpreter comprises instructions for interpreting sequences of commands from boot scripts stored in the memory of the electronic processing device.

4. The non-transitory computer-readable medium storing a bootloader of claim 3, wherein the interpreter comprises instructions for interpreting bytecode commands.

5. The non-transitory computer-readable medium storing a bootloader of claim 1, wherein the interpreter comprises instructions for interpreting commands in a command set, wherein the command set comprises any one or more of:
a conditional control-flow command for branching interpretation to another boot script;
a conditional control-flow command for transferring processor execution to an address in the memory;
an unconditional control-flow command for branching interpretation to another boot script;
a command for copying data from a first region of the memory to a second region of the memory;
a command for transferring processor execution to an address in the memory;
a command for decrypting data in a region of the memory;
a command for decompressing data in a region of the memory;
a command for verifying the integrity of data in a region of the memory;
a command for protecting a region of the memory;
a command for preventing a boot script from being interpreted again;
a command for resetting the processor; and
a command for associating a region of the memory with a firmware-image identifier.

6. The non-transitory computer-readable medium storing a bootloader of claim 1, wherein the integrity checker comprises instructions for checking the integrity of a boot script by checking one or more of:
a cyclic-redundancy check value;
a hash;
a cryptographic hash;
a message authentication code;
a keyed hash message authentication code; and
a cryptographic signature,
associated with the respective boot script.

7. The non-transitory computer-readable medium storing a bootloader of claim 1, wherein the bootloader is configured to prevent interpretation of some or all the commands in a boot script if the integrity of the boot script is not verified by the integrity checker.

8. The non-transitory computer-readable medium storing a bootloader of claim 1, wherein the bootloader comprises instructions for using the integrity checker to check the integrity of each of the plurality of boot scripts each time the bootloader is executed.

9. The non-transitory computer-readable medium storing a bootloader of claim 1, wherein the bootloader comprises instructions for determining if a condition associated with the control-flow command is met, and, if the condition is met, starting to interpret commands from the second boot script.

10. The non-transitory computer-readable medium storing a bootloader of claim 9, wherein the bootloader comprises instructions for determining whether the condition is met after interpreting one or more further commands in the first boot script.

11. The non-transitory computer-readable medium storing a bootloader of claim 1, wherein the bootloader comprises instructions for checking the integrity of a binary firmware image stored in the memory of the electronic processing device.

12. The non-transitory computer-readable medium storing a bootloader of claim 1, wherein the control-flow command identifies the second boot script by a script identifier, and wherein the bootloader comprises instructions for accessing mapping data in the memory of the electronic processing device that maps one or more script identifiers to one or more addresses in the memory at which a respective script is stored.

13. The non-transitory computer-readable medium storing a bootloader of claim 12, wherein the bootloader comprises instructions for identifying a first script identifier from an ordered set of script identifiers in the mapping data, and for start interpretation of a boot script that is mapped to the first script identifier in the mapping data, before any other boot script of the plurality of boot scripts, after the processor is reset.

14. The non-transitory computer-readable medium storing a bootloader of claim 1, wherein the bootloader comprises instructions for writing log entries to a journal in the memory of the electronic processing device, and for reading the journal after a reset to identify an unexpected reset during interpretation of a boot script and to use the journal to recover from the unexpected reset.

15. An electronic processing device comprising:
a processor; and
a memory storing a bootloader comprising software instructions for execution by the processor, wherein the bootloader comprises:
an interpreter for interpreting a boot script stored in the memory of the electronic processing device; and
an integrity checker for checking the integrity of boot scripts stored in the memory of the electronic processing device,
wherein:
the bootloader comprises instructions for using the integrity checker to check the integrity of a first boot script of a plurality of boot scripts stored in the memory of the electronic processing device;
the bootloader comprises instructions for using the integrity checker to check the integrity of a second boot script of the plurality of boot scripts stored in the memory of the electronic processing device, independently of the integrity of the first boot script; and the interpreter comprises instructions for interpreting a control-flow command in the first boot script, wherein the control-flow command conditionally or unconditionally branches interpretation to an address of the second boot script, thereby causing the bootloader to start interpreting commands from the second boot script.

16. The electronic processing device of claim 15, wherein the processor and the memory storing the bootloader are integrated on a single semiconductor substrate.

17. The electronic processing device of claim 15, wherein the bootloader is a single executable image and wherein the electronic processing device is configured to cause the processor to execute the bootloader in response to a reset of the processor.

18. The electronic processing device of claim 15, wherein the memory further stores the first boot script comprising a control-flow command for causing the bootloader start interpreting commands from the second boot script, and wherein the memory further stores the second boot script.

19. The electronic processing device of claim 18, wherein:
the first boot script comprises a command that, when interpreted by the interpreter, causes the bootloader to transfer execution to a first firmware image stored in the memory of the electronic processing device;
the second boot script comprises a command that, when interpreted by the interpreter, causes the bootloader to transfer execution to a second firmware image stored in the memory of the electronic processing device; and
the control-flow command in the first boot script conditionally causes the bootloader to start interpreting commands from the second boot script in response to an integrity verification of the first firmware image by the bootloader failing.

20. The electronic processing device of claim 15, wherein the memory stores at least one further executable firmware image, distinct from the bootloader, and wherein the bootloader comprises one or more instructions for transferring execution to the further executable firmware image.

\* \* \* \* \*